United States Patent
Fukushima et al.

(10) Patent No.: US 6,765,174 B2
(45) Date of Patent: Jul. 20, 2004

(54) METHOD FOR MACHINING GROOVES BY A LASER AND HONEYCOMB STRUCTURE FORMING DIE AND METHOD FOR PRODUCING THE SAME DIE

(75) Inventors: Takeshi Fukushima, Hekinan (JP); Yoshiyuki Horie, Chita (JP); Akira Sasaki, Takahama (JP)

(73) Assignee: Denso Corporation, Kariya (JP)

(*) Notice: Subject to any disclaimer, the term of this patent is extended or adjusted under 35 U.S.C. 154(b) by 155 days.

(21) Appl. No.: 10/059,245

(22) Filed: Jan. 31, 2002

(65) Prior Publication Data
US 2002/0106418 A1 Aug. 8, 2002

(30) Foreign Application Priority Data

| Feb. 5, 2001 | (JP) | 2001-028492 |
| Apr. 27, 2001 | (JP) | 2001-133131 |
| Nov. 22, 2001 | (JP) | 2001-358313 |
| Dec. 27, 2001 | (JP) | 2001-397717 |

(51) Int. Cl.$^7$ ............................................. B23K 26/00
(52) U.S. Cl. ........................ 219/121.69; 219/121.85
(58) Field of Search ...................... 219/121.69, 121.68, 219/121.67, 121.85

(56) References Cited

U.S. PATENT DOCUMENTS

| 6,376,799 B1 * | 4/2002 | Amako et al. | 219/121.77 |
| 2003/0172969 A1 * | 9/2003 | Jenson et al. | 136/252 |

FOREIGN PATENT DOCUMENTS

| EP | 1139415 A1 * | 3/2000 | H01L/21/68 |
| JP | A 60-124485 | 7/1985 | |
| JP | A 60-193452 | 10/1985 | |
| JP | A 11-780 | 1/1999 | |
| JP | A 2000-288752 | 10/2000 | |
| JP | A 2000-317661 | 11/2000 | |
| JP | 2000-288752 | * 12/2000 | |

* cited by examiner

Primary Examiner—M. Alexandra Elve
(74) Attorney, Agent, or Firm—Oliff & Berridge, PLC

(57) ABSTRACT

A laser groove machining method for forming bottomed grooves in a surface of a workpiece using a laser, wherein an emitting position of a laser beam which is to be emitted onto the workpiece is shifted relatively along groove forming positions at a high speed of 150 mm/min. or faster. Thus, melted portions which are melted by the laser beam can easily be separated, cooled and removed by shifting the laser beam emitting position at high speed. In addition, water may be jetted to the workpiece so as to form a pillar of water so that the laser beam is emitted through the interior of the pillar of water so formed.

12 Claims, 8 Drawing Sheets

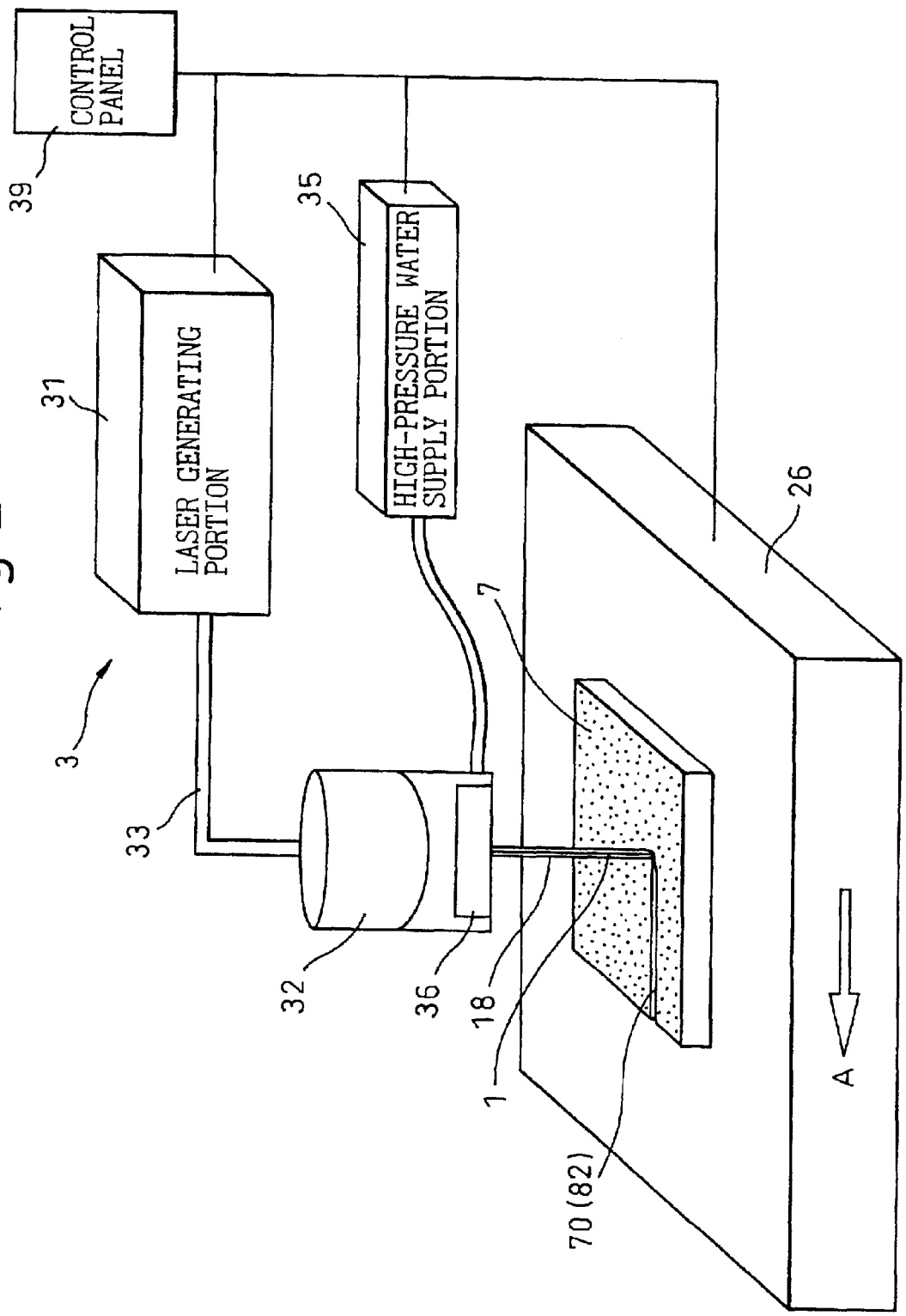

METHOD FOR MACHINING GROOVES BY A LASER AND HONEYCOMB STRUCTURE FORMING DIE AND METHOD FOR PRODUCING THE SAME DIE

BACKGROUND OF THE INVENTION

1. Field of the Invention

The present invention relates to a groove machining method for forming thin bottomed grooves in the surface of a metal workpiece using a laser and a honeycomb structure forming die using the same method and a method for producing the same die.

2. Description of the Related Art

Conventionally, machining using a laser has been used for welding and cutting a workpiece, but there has been no case where the laser machining is used for machining grooves having bottoms or bottomed grooves. In a cutting method using laser, a laser beam is emitted onto the workpiece to melt it, and a melted portion is removed with an assist gas or high-pressure water. To be specific, a laser beam is emitted onto the workpiece in such a manner as to be converged to a single location thereon so as to form a through hole, and then the laser beam emitting location is shifted to form another through hole in the workpiece. Thus, the workpiece is cut by continuously forming through holes.

In a case where an attempt is made to use this method to form grooves, it is possible to form through grooves which have no bottoms, but bottomed grooves have not been formed using the method. In addition, in the method in which the melted portion is removed by jetting high-pressure water, water remains on the surface of the workpiece, causing a problem that the path along which the laser beam is emitted is altered owing to the water so remaining on the surface of the workpiece, whereby the laser beam cannot be emitted onto a desired position with accuracy.

On the other hand, grid-like grooves are formed in a honeycomb structure forming die from which a ceramic honeycomb form is extruded. Most of these grooves are bottomed grooves which are large in depth and small in width. While grinding or electrical discharge machining has been used a method for forming such grid-like grooves, as there is an increasing tendency that the widths of grooves are required to be narrower to such as 100 µm or smaller, it is becoming more difficult to employ the aforesaid grinding and electrical discharge machining in which a grinding wheel and electrodes are physically used, respectively.

Incidentally, for example, a ceramic honeycomb structure made from mainly cordierite is produced by extruding the material using a forming die. This honeycomb structure so formed is constituted by many cells which are formed by providing bulkheads in a grid-like fashion, and in many cases the cells are each formed into, for example, a quadrilateral or hexagonal shape.

In addition, the aforesaid honeycomb structure forming die is used as a honeycomb structure forming die having supply holes for supplying a material and grooves adapted to communicate with the supply holes, respectively, for forming the material supplied from the supply holes into the aforesaid honeycomb shape.

In recent years, there has been a demand that the thickness of bulkheads of the honeycomb structure is smaller and is, for example, 100 µm or smaller. To cope with this demand, naturally, the width of the grooves of the honeycomb structure forming die must also be smaller.

However, if the width of the grooves of the honeycomb structure forming die is made narrower, as required, the flowability of the material which is supplied from the supply holes and then passes through the grooves is deteriorated. This increases the forming pressure while forming is carried out, leading to a risk that formability is reduced.

SUMMARY OF THE INVENTION

The invention was made in view of the problems inherent in the prior art, and an object thereof is to provide a method for forming narrow and deep bottomed grooves using laser, and a honeycomb structure forming die for forming a thin honeycomb structure without reducing the formability by making use of the bottomed grooves forming method and a method for producing the same forming die.

According to an aspect of the invention, there is provided a laser groove machining method for forming bottomed grooves in the surface of a workpiece using laser, wherein an emitting position of laser which is to be emitted on the workpiece is shifted relatively along groove forming positions at a high speed of 150 mm/min. or faster.

According to this groove machining method of the invention, the relative shifting speed of the laser beam emitting position is made to be the aforesaid high speed of 150 mm/min. or faster, whereby melted portions resulting at the surface of the workpiece, through the emission of the laser beam, can be blown off along the grooves so formed with an assist gas, thereby making it possible to separate, cool and remove the melted portions. Namely, the melted portions can be separated, cooled and removed with ease without forming through holes. This allows the laser machining, which has conventionally been used only for cutting and welding, to be applied to machining bottomed grooves.

According to another aspect of the invention, there is provided a method for producing a honeycomb structure forming die having supply holes for supplying a material and grooves adapted to communicate with the supply holes and formed into a grid-like configuration for forming the material into a honeycomb configuration, each groove having a groove depth which is ten times or more as large as a groove width thereof, wherein in machining the grooves in a die material, an emitting position of a laser beam, which is to be emitted to a surface of the forming die material which is opposite to a surface thereof where the grooves are formed, is shifted along groove forming positions.

According to this honeycomb structure forming die producing method of the invention, the method is adopted in which the laser beam is shifted relatively in machining the grooves, whereby grooves whose depth is greater than the width can be produced with ease.

Namely, in a case where grooves are formed in the die material, only by a laser beam, melted portions formed through being subjected to the emission of the laser beam set as they are, making it difficult to form grooves. Here, according to the method of the invention, as is described above, the laser beam is shifted relatively, whereby the melted portions can be separated, cooled and removed with easy by separating, cooling to set, and removing the melted portions with an assist gas. Thus, narrow and deep grooves can be formed using a laser with ease.

According to a further aspect of the invention, there is provided a honeycomb structure forming die having at least supply holes for supplying a material and grooves adapted to communicate with the supply holes and constructed to form the material into a honeycomb configuration, wherein inclined portions are provided at corner portions formed where bottom portions of the grooves intersect with sides of the supply holes, and wherein, at the inclined portions, the depth of the grooves gets deeper as the grooves approach the supply holes.

According to the honeycomb structure forming die of the invention, as is described above, the depth of the grooves is not uniform but is constructed to be deeper as the grooves approach the supply holes by providing the inclined portions at the corner portions. Owing to this, the material is allowed to flow smoothly when it passes from the supply holes to the grooves.

Namely, as the corner portions where the bottom portions of the grooves intersect with the sides of the supply holes are inclined, the material, which passes from the supply holes to the grooves, expands gradually along the inclined portions. Owing to this, when compared to a case where there is provided no inclined portion at the corner portions, the change in flowing direction when the material expands in the width direction can be reduced. Because of this, the material is allowed to flow smoothly when it penetrates into the grooves from the supply holes.

Then, owing to this, even in case the width of the grooves is made narrower, an increase in forming pressure can be suppressed, thereby making it possible to maintain a superior formability.

According to another aspect of the invention, there is provided a method for producing a honeycomb structure forming die having at least supply holes for supplying a material and grooves adapted to communicate with the supply holes and constructed to form the material into a honeycomb configuration, comprising the steps of forming the supply holes from a hole forming surface of a die material, thereafter jetting water to groove forming positions on a groove forming surface opposite to the hole forming surface so as to form a pillar of water so that a laser beam is emitted through the interior of the pillar of water and implementing scanning of the emitted laser beam in which the laser beam emitting position is shifted along the groove forming positions in such a manner as to pass along the same groove forming positions a plurality of times, increasing the number of times of scanning the emitted laser beam in the vicinity of corner portions formed where bottom portions of the grooves intersect with sides of the supply holes and forming inclined portions at the corner portions so that the depth of the grooves gets deeper as the grooves approach the supply holes.

According to this aspect of the invention, as described above, the laser beam which is caused to pass through the pillar of water is used to machine the grooves. In addition, the depth of the grooves is made to get deeper gradually by implementing the emission scanning of the laser beam as described above.

Thus, the depth of the grooves can be changed locally by changing the number of times of implementation of the emission scanning locally by adopting the laser machining method that has just been described above.

Owing to this, according to the aspect of the invention, the number of implementations of the emission scanning is increased in the vicinity of the corner portions formed where the bottom portions of the grooves intersect with the sides of the supply holes by changing the number of implementation of the emission scanning, whereby the inclined portions are formed at the corner portions so that the depths of the grooves become deeper as the grooves approach the supply holes.

In addition, according to the aspect of the invention, the laser beam is emitted through the pillar of water as described above, whereby the laser beam advances while being confined within the diameter of the pillar of water, so that the width of the grooves can be controlled to fall within the diameter of the pillar of water with accuracy. Owing to this, the groove machining that can well meet the accuracy required for the honeycomb structure forming die can be implemented with ease.

Thus, according to an aspect of the invention, the aggressive adoption of the aforesaid laser machining method enables the realization of the local change in depth of the grooves, which has been extremely difficult to be realized by the conventional grinding or electrical discharge machining. In addition, in particular, the honeycomb structure forming die which can provide the smooth flow of the material can be obtained by changing the depth of the grooves in such a manner as to form the inclined portions at the corner portions.

The present invention may be more fully understood from the description of preferred embodiments of the invention set forth below, together with the accompanying drawings.

BRIEF DESCRIPTION OF THE DRAWINGS

In the drawings:

FIG. 2 is an explanatory view showing the construction of a laser machining apparatus according to a second embodiment of the invention;

DESCRIPTION OF THE PREFERRED EMBODIMENTS (First Embodiment)

Figure 1:
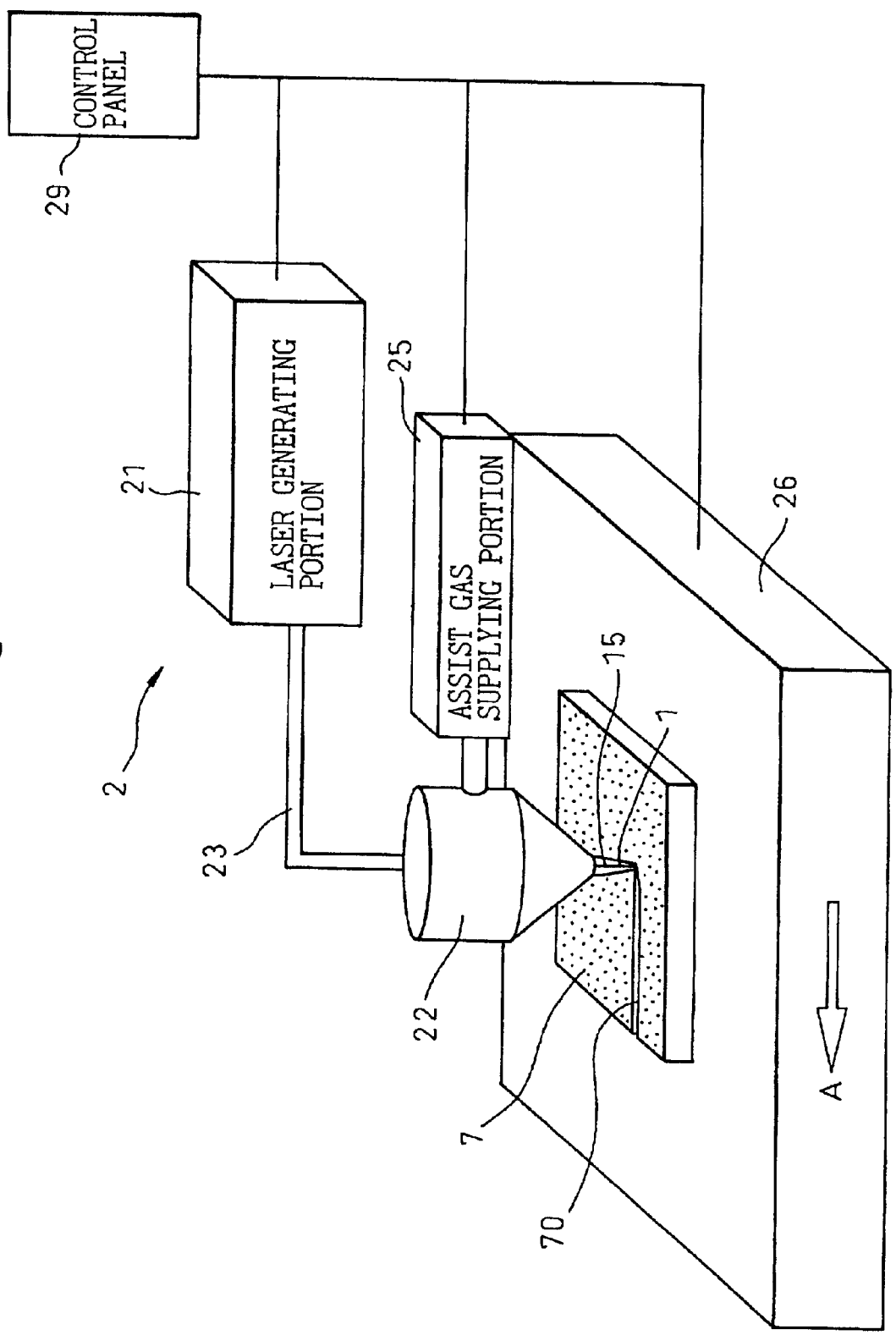
FIG. 1 is an explanatory view showing the construction of a laser machining apparatus according to a first embodiment of the invention.

Referring to FIG. 1, a laser groove machining method according to an embodiment of the invention will be described below.

In this embodiment, a bottomed groove 70 is formed in a surface of a workpiece 7 using laser. As this occurs, an emitting position of a laser beam 1 which is to be emitted to the workpiece 7 is shifted relatively along groove forming positions at a high speed of 150 mm/min. or faster.

This will be described in detail below.

A laser machining apparatus 2 shown in FIG. 1 is used in this embodiment. The laser machining apparatus 2 has a laser generating portion 21 for generating a laser beam 1, a laser head 22 for stopping the laser beam so generated to a desired diameter, an optical fiber portion 23 for providing a connection between the laser generating portion 21 and the laser head 22 so as to guide the laser beam 1 and an assist gas supply portion 25 for supplying to the laser head 22 an assist gas which is to be jetted around the laser beam 1. In addition, the apparatus has a bed 26 designed not only to hold the workpiece 7 thereon but also to be shifted on a plane. A bed driving portion is incorporated in the bed, and a control panel 29 is connected to the bed driving portion, the assist gas supply portion 25 and the laser generating portion 21 to control them.

As shown in the figure, the workpiece 7 is a metallic plate which is 15 mm thick, 200 mm wide and 200 mm long. The metallic plate is made of JIS (Japanese Industrial Standard) SKD 61 (ASTM H13). Of course, the workpiece may be made of different materials in different sizes.

In this embodiment, a 0.1 mm wide and 2.0 mm deep bottomed groove will be formed in the workpiece 7.

To be specific, the workpiece 7 is held on a support device, not shown, in such a manner as to move horizontally. Then, a laser beam 1 and an assist gas 15 are jetted from the laser machining apparatus 2 while the workpiece 7 is being shifted in a direction indicated by an arrow A shown in FIG. 1. The shifting speed of the workpiece 7 used in this embodiment was 240 mm/min. which is faster than 150 mm/min. Note that while the laser machining apparatus 2 may be used for conventional cutting, the maximum shifting speed of workpiece for such an application is 100 mm/min. In this embodiment, the emitting position of the laser beam 1 was shifted relatively at the speed which largely exceeds the maximum speed.

Accordingly, portions of the workpiece to which the laser beam 1 is emitted are sequentially melted, and thereafter the melted portions are separated, cooled and removed. As a result, an extremely shallow bottomed groove 70 is formed by a single emission of the laser beam 1. Then, in this embodiment, the emitting position of the laser beam 1 was shifted repeatedly in such a manner as to pass along the groove forming positions 150 times, whereby as has been described above, the narrow and deep bottomed groove 70 was obtained, with accuracy, which is 0.1 mm wide and 2.0 mm deep.

(Second Embodiment)

In this embodiment, a laser machining apparatus 3 which can, as shown in FIG. 2, jet a pillar of water was used in lieu of the laser machining apparatus 2 used in the first embodiment. As shown in FIG. 2, the laser machining apparatus 3 has a laser generating portion 31 for generating a laser beam, a laser head 32 for changing the laser beam so generated to a desired diameter, an optical fiber portion 33 for providing a connection between the laser generating portion 31 and the laser head 32 so as to guide the laser beam, a high-pressure water supply portion 35 for supplying, to the laser head portion 32, high-pressure water for use in jetting a pillar of water 18 around the laser beam 1 and a nozzle 36 for jetting high-pressure water in the form of a pillar of water 18. In addition, as in the case of the first embodiment, the apparatus has the bed 26 designed not only to hold the workpiece 7 thereon but also to be shifted on a plane. The bed driving portion, the high-pressure water supply portion 35 and the laser generating portion 31 are incorporated in the bed and are connected to a control panel 39 for controlling them.

Then, water was jetted to the workpiece 7 using the laser machining apparatus 3 to form a pillar of water 18 and the laser beam 1 was emitted to the workpiece 7 through the pillar of water 18. In addition, the emitting position of the laser beam 1 was shifted relatively at the high speed of 240 mm/min. as with the first embodiment. The laser beam 1 was emitted 150 times as with the first embodiment.

In this embodiment, the laser beam 1 is emitted to the workpiece 7 while being confined within the pillar of water 18, and melted portions which are melted by the laser beam 1 are efficiently separated, cooled and removed with water jetted therearound, whereby a bottomed groove can be machined more accurately. As a result, in this embodiment, too, a narrow and deep bottomed groove 70 was obtained, with accuracy, which is 0.1 mm wide and 2.0 mm deep.

In addition, in the first and second embodiments, it is desirable that the emitting position of the laser beam is shifted repeatedly in such a manner as to pass over the groove forming positions a plurality of times. In this case, the amount of machining through a single emission of the laser beam can be set to a limited amount, and hence the amount of melting through the single emission of the laser beam becomes small. Owing to this, melted portions can be blown off with, for example, the assist gas along the groove being formed, whereby the melted portions can easily be separated, cooled and removed. Consequently, a bottomed groove can be machined with higher accuracy.

In addition, the workpiece may be made of another metallic material. While the groove machining method using the laser beam may also be applied to a workpiece which is made of ceramics or any other material, the method can be effective particularly when it is applied to the workpiece made of a metallic material. Namely, in a case where the workpiece is made of a metallic material, melted portions which are melted through emission of a laser beam tend to set as they are at their original positions, this making groove machining in the metallic material difficult. However, as is described above, relatively shifting the laser beam emitting position at the high speed of 150 mm/min. or faster can provide the aforesaid function and effect and enable grooves to be machined in metallic materials.

In addition, the bottomed groove may be a bottomed groove having a depth which is ten times or more greater than the width thereof. In this case, in particular, the aforesaid superior function and effect can effectively be used. Namely, according to the invention, the emitting position of the laser beam which is emitted to the workpiece is shifted relatively along the groove forming positions at the high speed of 150 mm/min. or faster. Owing to this, the melted portions which are melted through emission of the laser beam can easily be separated, cooled and removed by blowing off the melted portions, with, for example, the assist gas, along the groove being formed. Consequently, the bottomed groove which is greater in depth than in width can be machined with higher accuracy. Thus, according to the invention, a bottomed groove can be formed which has a depth which is ten times or more greater than the width thereof.

Note that according to the invention, even a bottomed groove can be formed which has a depth which is twenty times or more greater than the width thereof.

Additionally, the bottomed groove may be a U-shaped groove. Here, the U-shaped groove can be defined as a groove in which, assuming that a circle R contacts both side walls of a sectional curve of the groove and the bottom thereof, respectively, the sectional curve connecting the side walls of the groove with the bottom thereof always passes outside of the circle R.

In this case, too, the aforesaid superior function and effect of the invention can be used effectively.

(Third Embodiment)

In this embodiment, a honeycomb structure forming die is produced using the laser groove machining method according to the second embodiment of the invention.

Figure 3A:
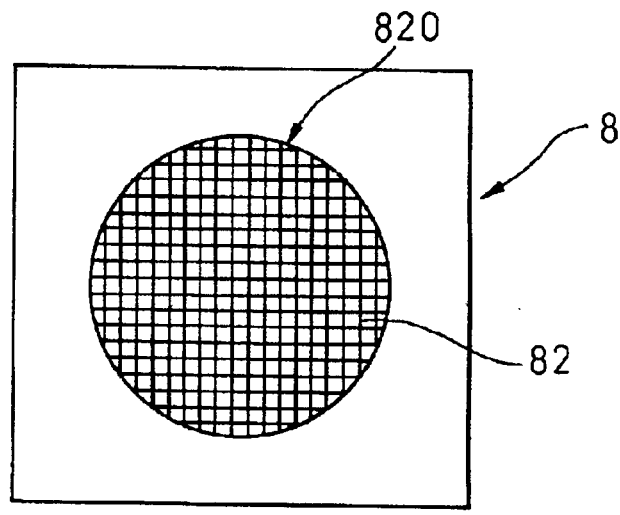
FIG. 3A is a plan view of a honeycomb structure forming die according to a third embodiment of the invention.
Figure 3B:
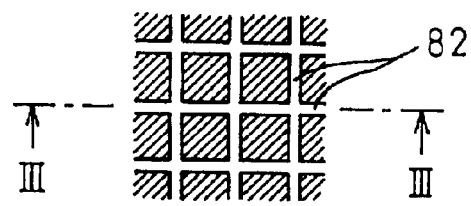
FIG. 3B is an enlarged view of a main part thereof and FIG. 3C is a sectional view taken along the line III—III in FIG. 3B.
Figure 3C:
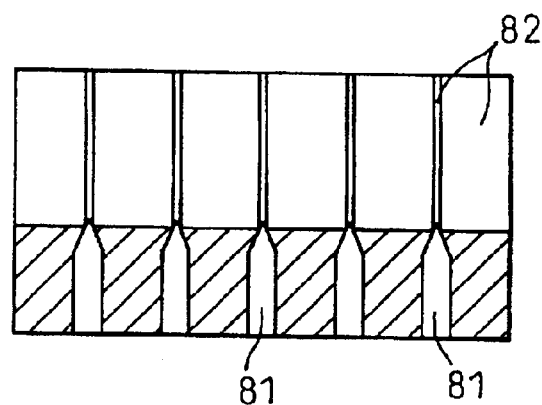

As shown in FIGS. 3A to 3C, a honeycomb structure forming die 8 which is to be produced in this embodiment has supply holes 81 for supplying a material and grooves 82 adapted to communicate with the supply holes 81 and constructed into a grid-like configuration for forming the material into a honeycomb configuration, and each groove 82 has a depth which is ten times or more greater than the width thereof.

In addition, the grooves 82 according to this embodiment are formed into a square grid configuration relative to a grooves forming portion 820 which protrudes from a surrounding area.

In producing a honeycomb structure forming die 8 configured as described above, firstly, a die material is prepared which has a grooves forming portion 820 which protrudes as described above. Then, the supply holes 81 (FIG. 3C) are formed, using a drill, from the back of the die material or an opposite side to a side where the grooves forming portion 820 is provided. Next, grooves 82 are formed in the grooves forming portion 820 using the same method as that described in the second embodiment.

Namely, the die material 80 was set on the bed 26 of the laser machining apparatus 3 shown in FIG. 2 and the emitting position of the laser beam 1 was shifted repeatedly vertically and horizontally in a grid-like fashion. The relative shifting speed and the number of times of repeated shifting of the emitting position at that time were 240 mm/min. and 150 times, respectively, which are identical to those described in the second embodiment.

Accordingly, a honeycomb structure forming die 8 could be obtained with accuracy which has slit grooves 82 each being 0.1 mm wide and 2.0 mm deep.

(Fourth Embodiment)

Figure 4A:
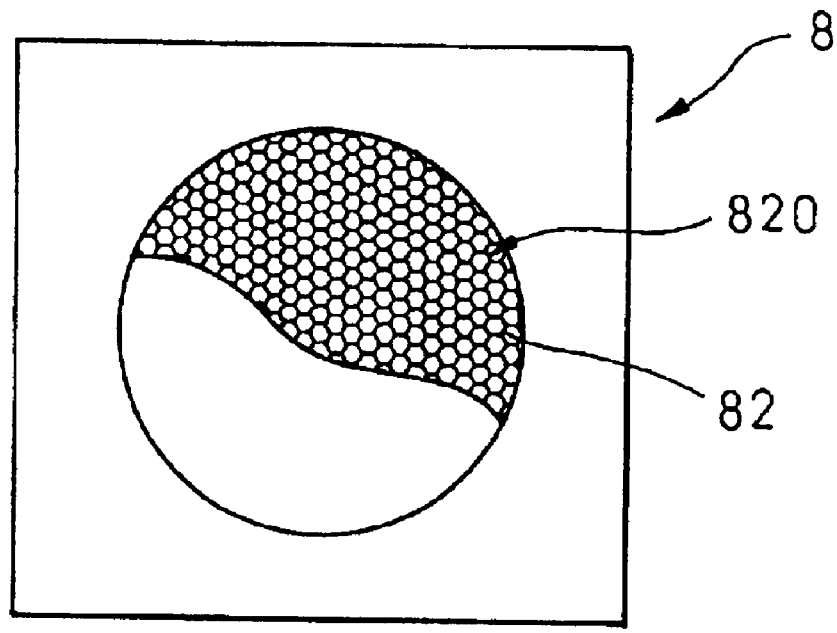
FIG. 4A is a plan view of a honeycomb structure forming die according to a fourth embodiment of the invention.
Figure 4B:
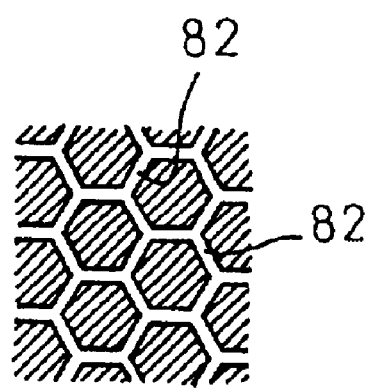
FIG. 4B is an enlarged view of a main part thereof.

As shown in FIGS. 4A, 4B, this embodiment provides an example in which the grid configuration of the grooves 82 of the honeycomb structure forming die 8 described in the third embodiment is modified to a hexagonal shape.

In this embodiment, similar conditions to those in the third embodiment were used to produce a honeycomb structure forming die except that the shifting route of the emitting position of the laser beam 1 was changed. In this case, in particular, grooves 82 in hexagonal configuration, which could not be formed only with the electrical discharge machining, can be formed efficiently and accurately using the grooves machining method employing laser, and the grooves forming process can largely be rationalized, whereby the cost and time required to produce honeycomb structure forming dies can be reduced.

(Fifth Embodiment)

This embodiment provides an example in which the grooves of the honeycomb structure forming die according to the third embodiment is formed under the following laser machining conditions. In this embodiment, the grooves 82 were formed with the laser machining apparatus 3 described in the third embodiment under laser machining conditions in which the frequency is 400 Hz, pulse is 120 $\mu$m/sec, voltage is 700V, hydraulic pressure is 100 bar, STEP is 10 $\mu$m, shifting speed is 240 mm/min. and the number of times of scanning is 80 to 130 times.

As a result, 40 to 150 $\mu$m wide and 2.0 to 3.5 mm deep grooves 82 were formed in the honeycomb structure forming die 8.

(Sixth Embodiment)

In this embodiment, experiments were made to obtain a relationship between the shifting speed of the emitting position of the laser beam 1 and the depth and width of the bottomed grooves 70 using the laser machining apparatus 3 according to the second embodiment. Note that the laser machining conditions were identical to those in the fifth embodiment except for the shifting speed of the emitting position of the laser beam 1.

Figure 5:
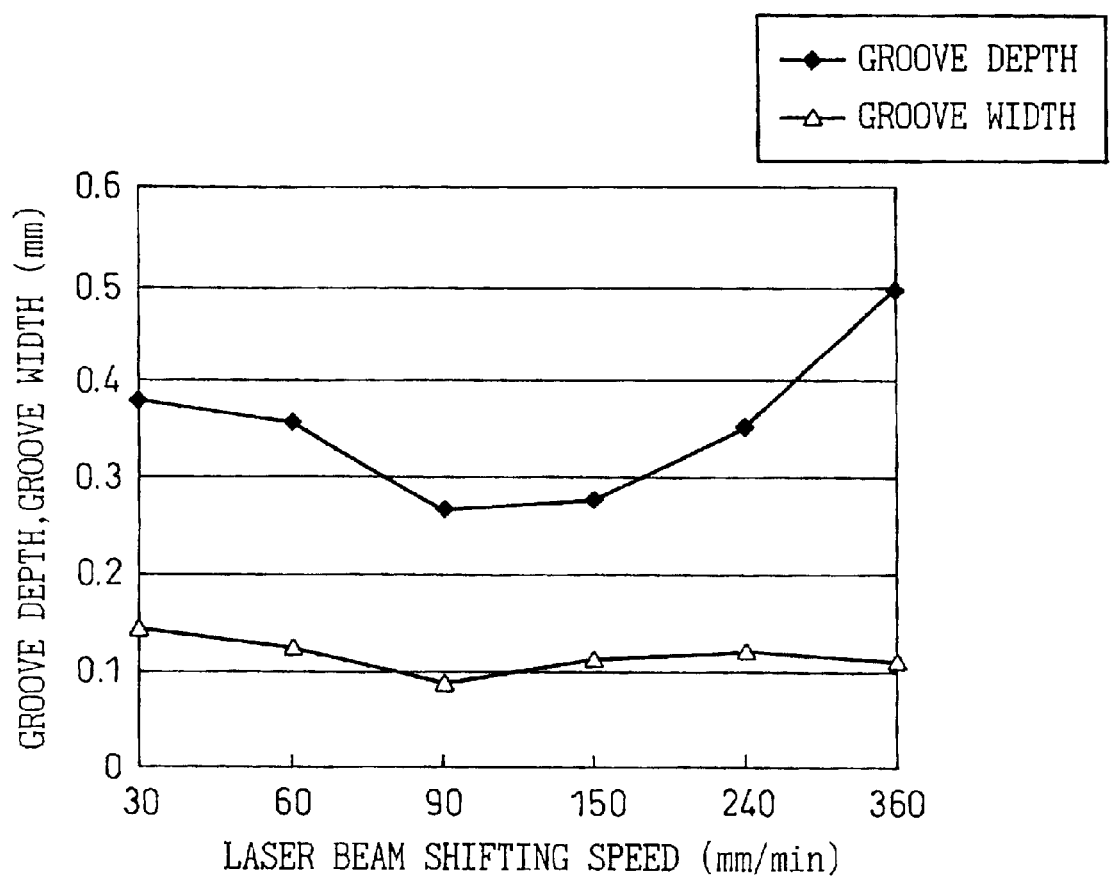
FIG. 5 is a graph showing a relationship between the shift speed of a laser beam emitting position and the depth and width of a bottomed groove to be formed according to a sixth embodiment of the invention.

The results of the experiments are shown in FIG. 5. In the figure, the axis of abscissas represents the shifting speed of the emitting position of the laser beam 1 whereas the axis of ordinates represents the depth and width of the bottomed grooves 70.

In addition, as is seen from the figure, setting the shifting speed of the emitting position of the laser beam 1 to 150 mm/min. or faster can provide an advantage that the machining time per scan can be reduced. In addition, with the number of times of scanning being the same, there is provided an advantage that the bottomed grooves 70 can be formed deeper.

As a result, it is found that in forming the bottomed grooves 70 by emitting the laser beam 1, the efficiency can considerably be improved by setting the shifting speed of the emitting position of the laser beam 1 to 150 mm/min. or faster.

Thus, in producing honeycomb structure forming dies by the laser beam, it is preferable to relatively shift the emitting position of the laser beam at the shifting speed of 150 mm/min. or faster. As this occurs, melted portions formed by being subjected to emission of the laser beam can easily be separated, cooled and removed by separating, cooling to set and removing the melted portions so formed, along a groove being formed, with, for example, an assist gas. Consequently, as has been described above, grooves whose depth is greater than the width can be formed with higher accuracy.

In addition, it is preferable to form a pillar of water by jetting water to the die forming material so that the laser beam is emitted to the die forming material while being caused to pass through the pillar of water. As this occurs, the laser beam is emitted to the die forming material while being confined within the pillar of water, and melted portions by the laser beam so emitted are efficiently separated, cooled and removed by water jetted around the melted portions, whereby the grooves can be machined with higher accuracy.

In addition, it is preferable that the emitting position of the laser beam is repeatedly performed in such a manner as to pass along the grooves forming positions a plurality of times. As this occurs, the machining amount per single emission of laser beam can be set small and therefore the amount of melting through the emission of laser beam becomes small, whereby the melted portion can easily be separated, cooled and removed by for example, blowing off the melted portion along the groove being formed with the assist gas. Thus, as has been described above, the grooves whose depth is greater than the width can be formed with higher accuracy.

Furthermore, the grooves can be formed into a grid-like configuration in which circular, triangular, square or hexagonal shapes are continuously connected to each other. With any of the shapes, the aforesaid superior function and effect can effectively be used. Thus, the grooves forming process can considerably be rationalized by putting the groove machining by the laser beam to practical use while avoiding high-cost electrical discharge machining.

Moreover, it is preferable that the material of the honeycomb structure forming die is cemented carbide or alloy tool steel. While the groove machining method using the laser beam can be applied to a workpiece made of ceramics or any other material, the method becomes effective when applied, in particular, to a workpiece made of the aforesaid cemented carbide or alloy tool steel (for example, JIS, SKD61) or any other steel material. Namely, in a case where a workpiece is made of the aforesaid material, melted portions which are partially melted through emission of a laser beam tend to set as they are at their original positions, this making the groove machining by the laser beam difficult. However, the aforesaid superior function and effect can be obtained by relatively shifting the laser emitting position as is described above, whereby grooves can be machined in the metallic material.

In addition, when used herein, the cemented carbide material means a powder metallurgy alloy which is produced by hardening tungsten carbide powder containing cobalt powder as a binder with a press and thereafter sintering the powder so hardened.

Furthermore, it is preferable that the width of the grooves is 40 to 150 $\mu$m and that the depth thereof is 2.0 to 3.5 mm. The aforesaid superior function and effect can effectively employed in particular in forming those narrow and deep grooves.

Moreover, the tolerance of the depth of the slit grooves can be limited to 0.3 mm or less. In this case, in particular, the aforesaid superior function and effect can effectively be employed. Namely, according to the method of the invention, the laser beam can be shifted relatively in machining the grooves, whereby the melted portions can be separated, cooled and removed by separating, cooling to set and removing the melted portion along the groove being formed with the assist gas. Consequently, the bottomed grooves having the depth tolerance of 0.3 mm or less can be formed by optimizing the shifting speed.

(Seventh Embodiment)

Referring to FIGS. 2 and 6A to 6C, a seventh embodiment according to the invention will be described below.

Figure 6A:
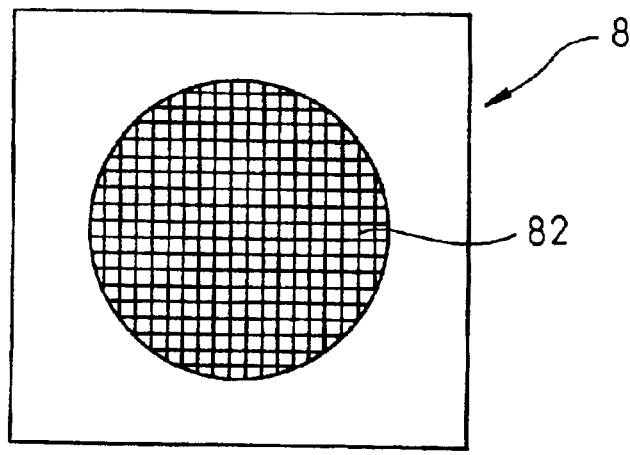
FIG. 6A is a plan view of a honeycomb structure forming die according to a seventh embodiment of the invention.
Figure 6B:
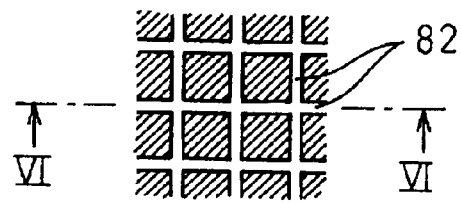
FIG. 6B is an enlarged view of a main part thereof and FIG. 6C is a sectional view taken along the line VI—VI in FIG. 6B.
Figure 6C:
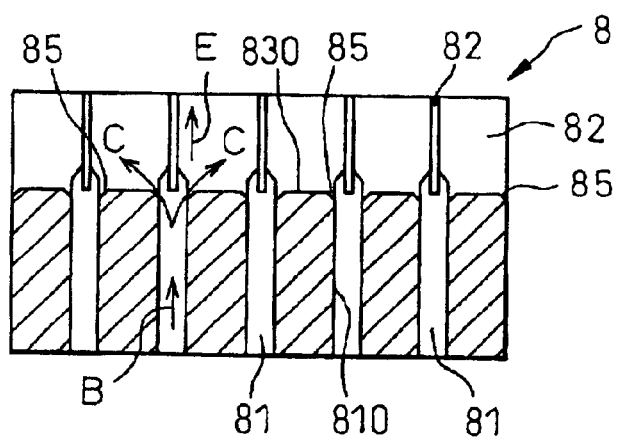

A honeycomb structure forming die 8 according to this embodiment is, as shown in FIGS. 6A to 6C, a honeycomb structure forming die 8 having at least supply holes 81 for supplying a material and grooves 82 adapted to communicate with the supply holes 81 and constructed to form the material into a honeycomb configuration. In the honeycomb structure forming die 8 according to the embodiment, inclined portions 85 are formed at corner portions formed where bottom portions 830 of the grooves 82 intersect with sides 810 of the supply holes 81, and the depth of the grooves 82 is made to be deeper gradually as the bottom portions approach the supply holes 81 at the inclined portions 85.

The laser machining apparatus 3 shown in FIG. 2 is used to produce the honeycomb structure forming die 8.

As shown in the figures, a die material 7, which is a workpiece to be machined, is a square metallic plate which is 15 mm thick, 200 mm wide and 200 mm long and is formed of JIS, SKD61. Of course, die materials in sizes and of materials which are different from those described above may be used.

In this embodiment, 0.1 mm wide and 2.0 mm deep slit grooves are formed in the die material 7. In addition, in this embodiment, as shown in FIG. 6C, the supply holes 81 had been provided in advance, by drilling, before the grooves 82 were machined.

Then, the die material 7 is held on a support device, not shown, in such a manner as to move in horizontal directions. Then, while shifting the die material 7 in a direction indicated by an arrow A illustrated in FIG. 2, water is jetted from the laser machining apparatus 8 to a groove forming position on a groove forming surface of the die material 7 so as to form a pillar of water 18 and a laser beam 1 is emitted through the pillar of water 18. Furthermore, the emitting position of the laser beam 1 is shifted along groove forming positions and emission scanning is performed in which the emitting position of the laser beam is caused to pass along the groove forming positions a plurality of times.

As this occurs, the shifting speed of the die material 7 was set to 240 mm/min., which is faster than 150 mm/min. Then, firstly, the emission scanning was performed in such a manner that the laser emitting position was caused to pass through the entire groove forming positions 150 times evenly, whereby as has been described above, narrow and deep grooves 82 (70) were obtained which are 0.1 mm wide and 2.0 mm deep.

Moreover, in this embodiment, the number of times of emitting the laser beam was designed to be increased in such a manner that the number of times of scanning increases as the bottom portions of the grooves 82 approach the supply holes 81 in the vicinity of the corner portions formed where the bottom portions 830 of the grooves 82 so formed intersect with the side 810 of the supply holes 81, whereby, as shown in FIG. 6c, the grooves 82 were machined in such a manner that the depth of the grooves 82 become gradually deeper as the bottom portions of the grooves 82 approach the supply holes 81 and inclined portions 85 are provided at the corner portions.

Next, the function and effect of this embodiment will be described below.

As has been described above, in the honeycomb structure forming die 8 according to this embodiment, the depth of the grooves 82 is not uniform, and the corner portions are inclined to form the inclined portions 85 so that the depth of the grooves 82 becomes deeper as the bottom portions of the grooves 82 approach the supply holes 81. Owing to this construction, the material passing from the supply holes 81 to the grooves 82 is allowed to flow smoothly.

Namely, as the corner portions where the bottom portions 830 of the grooves 82 intersect with the sides 810 of the supply holes 81 are inclined, the material passing from the supply holes 81 to the grooves expands gradually along the inclined portions 85. Owing to this, when compared to a case where no inclined portion 85 is provided at the corner portions, the variation in the flowing direction occurring when the material expands in the widthwise direction can be made small, whereby the material is allowed to flow smoothly when it penetrates from the supply holes 81 into the grooves 82. Then, because of this, even in a case where the width of the grooves 82 is as small as 0.1 mm, as described above, an increase in forming pressure can be suppressed, whereby superior formability can be maintained.

In addition, the unique machining method that has been described above is adopted in machining the superior grooves 82 of the honeycomb structure forming die 8. Namely, the laser beam 1 is used which is caused to pass through the pillar of water 18, and the number of times of emission scanning is changed locally, whereby the depth of the grooves can be changed locally.

In this embodiment, the number of times of emission scanning is increased in the vicinity of the corner portions, whereby the inclined portions 85 can be formed with ease, thereby making it possible to obtain a configuration in which the depth of the grooves 82 is made deeper as the bottom portions of the grooves 82 approach the supply holes 81.

Thus, it is difficult to obtain these advantages with the conventionally used grinding or electrical discharge machining method.

COMPARISON EXAMPLE

A comparison example provides an example in which the grooves 82 machining method is changed to the conventional electrical discharge machining and a honeycomb structure forming die 9 is obtained in which the depth of grooves 82 is made uniform. The other portions of the construction of the die remains the same as that of the honeycomb structure forming die in the seventh embodiment.

Figure 7:
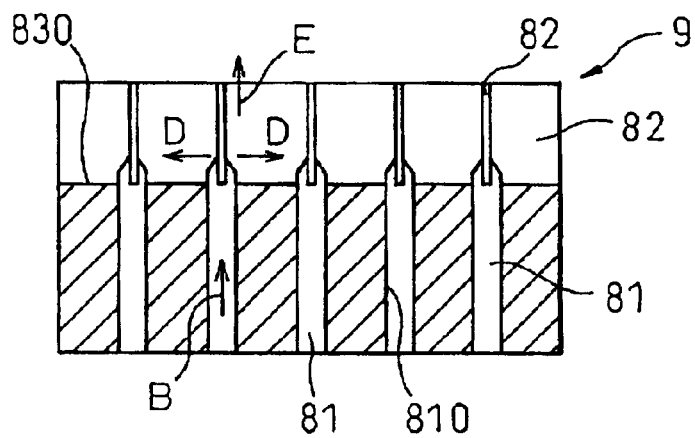
FIG. 7 is a sectional view of a honeycomb structure forming die taken as a comparison example which is produced using a conventional electrical discharge machining.

Shown in FIGS. 6C and 7 are flowing directions of the material which take place when honeycomb structures are extrusion formed using the honeycomb structure forming die 8 of the seventh embodiment and the honeycomb structure forming die 9 of the comparison example, respectively. Note that, for example, a ceramic material produced by mixing a plurality of kinds of powder, which can be raw materials of cordierite, with a binder can be used as the ceramic material for the honeycomb structures. In addition, material powder whose grain size is 60 μm or smaller can be adopted.

As shown in FIG. 7, in the case of the conventional honeycomb structure forming die 9, as the grooves 82 are formed in such a manner that the depth thereof becomes uniform, the flow of the forming material which is supplied into the supply holes 81 in a direction indicated by an arrow B is changed to directions indicated by arrows D which are normal to the direction indicated by the arrow B at the corner portions where the material so supplied intersects with the grooves 82 and then is changed to a direction indicated by an arrow E, as a result of collision between the material so supplied, so as to be extruded from the slit grooves 82 for extrusion forming a honeycomb structure.

On the other hand, as shown in FIG. 6C, in the case of the honeycomb structure forming die 8 according to the invention, as the inclined portions 85 are provided and the depth of the grooves 82 is constructed to get deeper gradually as the bottom portions of the grooves 82 approach the supply holes 81, the flow of the material supplied into the supply holes 81 in a direction indicated by an arrow B is changed to directions indicated by arrows C along the inclination of the inclined portions 85 at the corner portions where the material so supplied intersects with the grooves 82. Then, the flow of the material is finally changed to a direction indicated by an arrow E so as to be extruded from the grooves 82 for extrusion forming a honeycomb structure.

Thus, since the variation in flowing direction of the material is smaller when the honeycomb structure forming die according to the seventh embodiment is used than when the honeycomb structure forming die of the comparison example, the increase in forming pressure can be suppressed, thereby making it possible to maintain superior formability even when the width of the slit grooves becomes narrower.

(Eighth Embodiment)

Figure 8A:
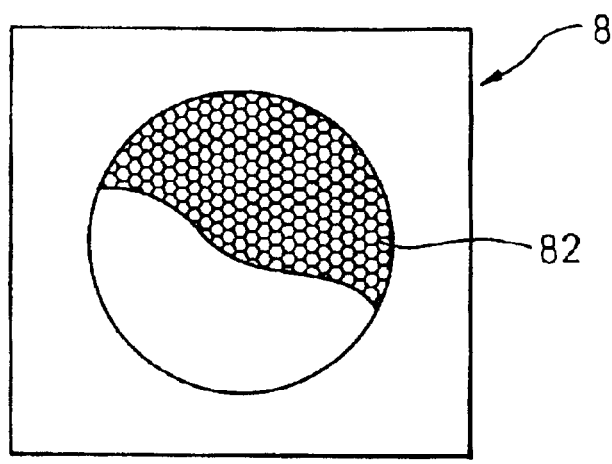
FIG. 8A is a plan view of a honeycomb structure forming die according to an eighth embodiment of the invention.
Figure 8B:
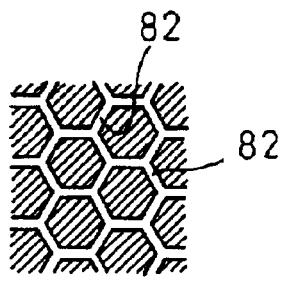
FIG. 8B is an enlarged view of a main part thereof.

As shown in FIGS. 8A, 8B, this embodiment provides an example in which a honeycomb structure is produced which has a honeycomb structure having slit grooves 82 formed into a hexagonal grid-configuration.

In this case, the scanning path of the emitted laser beam 1 employed in the seventh embodiment is devised such that the trace of the emitted laser beam 1 so scanned is formed into the hexagonal grid-like configuration.

In this case, too, a similar function and an effect, to those provided in the seventh embodiment, can be obtained.

(Ninth Embodiment)

In this embodiment, similarly to the seventh embodiment, inclined portions 85 are provided in a honeycomb structure forming die 8, and the configuration thereof is measured in a quantitative fashion.

Figure 9:
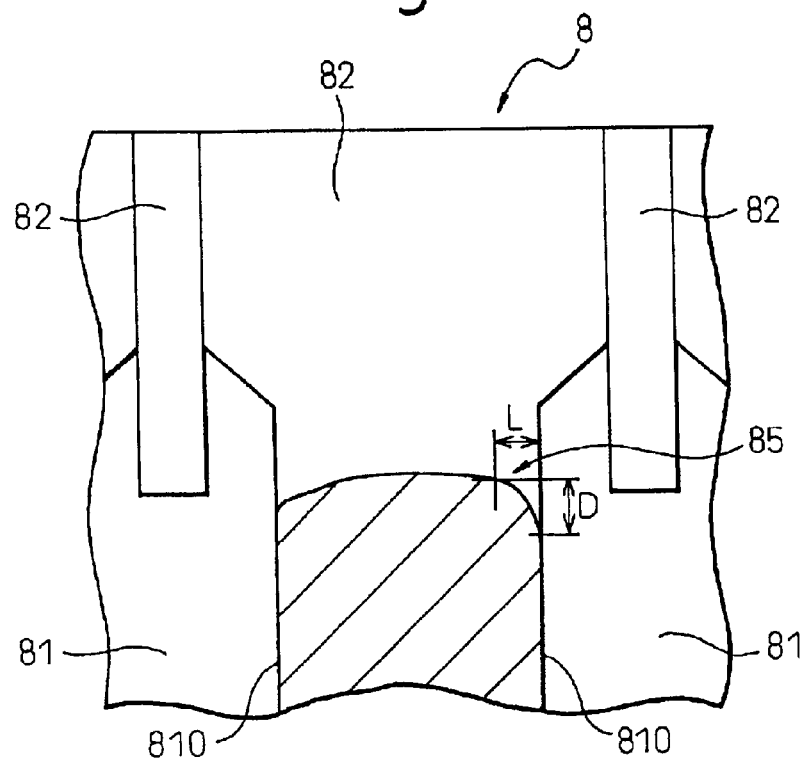
FIG. 9 is an enlarged explanatory view of an inclined portion of a honeycomb structure forming die according to a ninth embodiment of the invention.

As shown in FIG. 9, in the honeycomb structure forming die 8 according to this embodiment, the diameter of supply holes 81 is 1 mm, and the pitch of the supply holes is 2 mm. In addition, the inclined portions 85 are provided in a similar manner to that used in the seventh embodiment. Note that the width of grooves 82 formed is 0.1 mm, which is similar to that of the grooves 82 formed in the seventh embodiment.

As shown in the figure, the inclined portion 85 according to the embodiment is formed over a distance L ranging from 0.3 mm and more from the side 810 of the supply hole 81, and the final depth D thereof is 0.3 mm and above.

Figure 10:
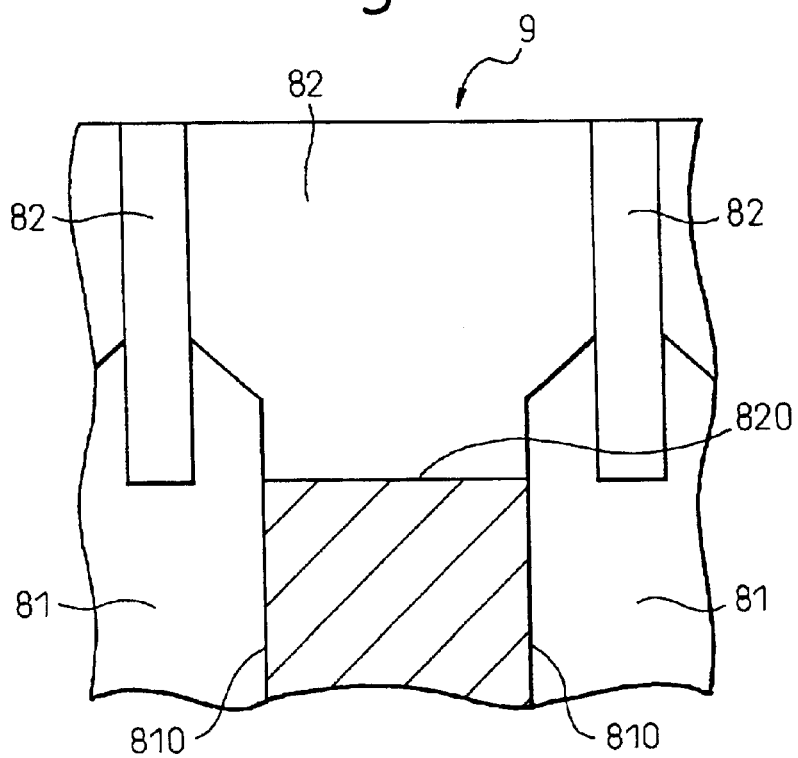
FIG. 10 is an enlarged explanatory view of an inclined portion of a honeycomb structure forming die taken as a comparison example which is produced using a conventional cutting process.

In this embodiment, as shown in FIG. 10, for the purpose of comparison, the method for forming grooves 82 was changed to the grinding method and a honeycomb structure forming die 9 having no inclined portions was produced. Then, an extrusion forming was actually performed using the honeycomb structure forming die 9 (a comparison article) which is a comparison example with the honeycomb structure forming die 8 according to the embodiment (an article according to the invention) to make a comparison between forms so produced using the respective dies.

The results of the comparison disclosed that when compared with the comparison article, with the article according to the invention, the material flowed smoothly and superior extrusion formability could be obtained.

It was found from the results of the comparison that, in the event that the width of the grooves 82 is 0.1 mm as is described above, the flowability of the material which passes from the supply holes 81 to the grooves 82 can be improved by providing the inclined portions 85 which are formed over the distance L ranging from 0.3 mm and above from the sides 810 of the supply holes 81 and whose final depth D thereof is 0.3 mm and above.

In addition, as a result, in a case where the flowability of the material may remain the same as that provided by the conventional example, the required flowability can be secured sufficiently even if the depth of the grooves 82 is made shallow. Owing to this, since the depth of the grooves 82 can be made shallower by, for example, in the order of one third of the final depth D, the machining efficiency can be improved.

In the above embodiment, the inclined portions at the corner portions may take the form of a fine inclination which would result when the corner portions were chamfered or a relatively long taper. Furthermore, the inclined portions may be straight or curved.

In addition, the slit grooves can be laid out in a square or a hexagonal grid-like configuration.

Furthermore, a narrow width of, for example, 40 to 150 μm may be adopted as the width of the grooves. In this case, too, a smooth flow of the forming material, such as described above, can be secured. In addition, the depth of the grooves may be set to be ten times or more as large as the width thereof. In this case, too, the inclination of the corner portions functions effectively, and the deterioration in flowability of the forming material can be suppressed.

Moreover, it is preferable that the laser beam emitting position is shifted at the relative speed of 150 mm/min. or faster, whereby groove machining can be progressed step by step while melted portions, which have been melted through emission of the laser beam, are separated and removed with ease. In contrast, in the event that the relative shifting speed is below 150 mm/min., the separation and removal of the melted portions cannot be implemented sufficiently, thereby causing a problem that the groove forming efficiency is deteriorated.

In addition, it is preferable that the inclined portions are provided within a distance ranging up to 0.5 mm from the sides of the supply holes. In this case, the inclined portions can be formed relatively easily.

Additionally, it is preferable that the inclined portions are provided over a distance ranging from 0.3 mm and above from the sides of the supply holes and that the final depth of the inclined portions is 0.3 mm and above.

In this case, the advantage of a smooth flow of the material can be exhibited sufficiently which results from the existence of the inclined portions.

While the invention has been described by reference to the specific embodiments chosen for purposes of illustration, it should be apparent that numerous modifications could be made thereto by those skilled in the art without departing from the basic concept and scope of the invention.

What is claimed is:

1. A method for producing a honeycomb structure forming die having supply holes for supplying a material and grooves adapted to communicate with said supply holes and formed into a grid-like configuration for forming said material into a honeycomb configuration, each groove having a groove depth which is ten times or more as large as a groove width thereof, wherein, in machining said grooves in a die material, an emitting position of a laser beam which is to be emitted to a surface of said die material which is opposite to a surface thereof where said supply holes are formed, is shifted along groove forming positions.

2. A method for producing a honeycomb structure forming die as set forth in claim 1, wherein, when shifting said emitting position of said laser beam along said groove forming positions, said emitting position of said laser beam is shifted relatively along said groove forming positions at a high speed of 150 mm/min. or faster.

3. A method for producing a honeycomb structure forming die as set forth in claim 1, wherein water is jetted to said die material so as to form a pillar of water, and wherein said laser beam is emitted onto said die material through the interior of said pillar of water.

4. A method for producing a honeycomb structure forming die as set forth in claim 1, wherein shifting of said emitting position of said laser beam is repeatedly performed in such a manner as to pass over said groove forming positions a plurality of times.

5. A method for producing a honeycomb structure forming die as set forth in claim 1, wherein said grooves are formed into a grid-like configuration comprising round, triangular, square of hexagonal shapes which are continuously connected to each other.

6. A method for producing a honeycomb structure forming die as set forth in claim 1, wherein the material of said honeycomb structure forming die is a cemented carbide or alloy tool steel.

7. A method for producing a honeycomb structure forming die as set forth in claim 1, wherein the width of said slit grooves is 40 to 150 µm and the depth thereof is 2.0 to 3.5 mm.

8. A method for producing a honeycomb structure forming die as set forth in claim 1, wherein the tolerance in the depth of said grooves is 0.3 mm or less.

9. A method for producing a honeycomb structure forming die having at least supply holes for supplying a material and grooves adapted to communicate with said supply holes and constructed to form said material into a honeycomb configuration, comprising the steps of forming said supply boles from a hole forming surface of a die material, thereafter jetting water to groove forming positions on a groove forming surface opposite to said hole forming surface so as to form a pillar of water so that a laser beam is emitted through the interior of said pillar of water and implementing scanning of said emitted laser beam in which said laser beam emitting position is shifted along said groove forming positions in such a manner as to pass along said same groove forming positions a plurality of times, increasing the number of times of scanning said emitted laser beam in the vicinity of corner portions formed where bottom portions of said grooves intersect with sides of said supply holes so that the depth of said grooves gets deeper as said grooves approach said supply holes and forming inclined portions at the corner portions.

10. A method for producing a honeycomb structure forming die as set forth in claim 9, wherein shifting of said laser beam emitting position is performed at a relative speed of 150 mm/min. or faster.

11. A method for producing a honeycomb structure forming die as set forth in claim 9, wherein said inclined portions are formed within a distance ranging up to 0.5 mm from the sides of said supply holes.

12. A method for producing a honeycomb structure forming die as set forth in claim 9, wherein said inclined portions are formed over a distance ranging from 0.3 mm and above from the sides of said supply holes and wherein the final depth of said inclined portions is 0.3 mm and above.

* * * * *